Patented Dec. 12, 1922.

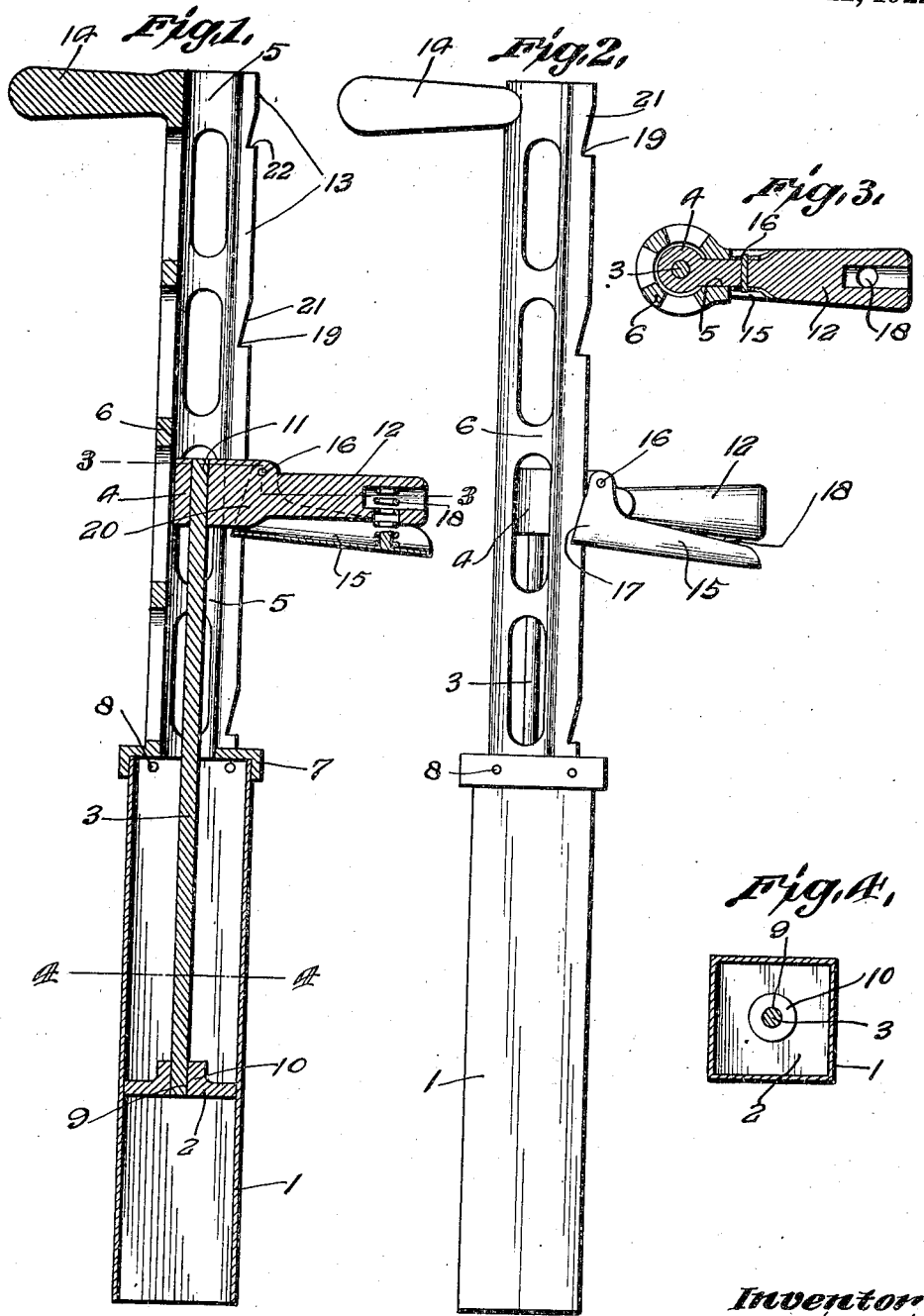

1,438,315

UNITED STATES PATENT OFFICE.

EUGENE W. KNOWLTON, OF BUFFALO, NEW YORK, ASSIGNOR TO JOHN E. SMITH'S SONS COMPANY, OF BUFFALO, NEW YORK, A CORPORATION OF NEW YORK.

MOLDING AND MEASURING MACHINE.

Application filed October 4, 1920. Serial No. 414,568.

*To all whom it may concern:*

Be it known that I, EUGENE W. KNOWLTON, a citizen of the United States, residing at Buffalo, county of Erie, State of New York, have invented certain new and useful Improvements in Molding and Measuring Machines, of which the following is a specification.

This invention relates to molding and measuring machines.

An object of the invention is to provide suitable means for measuring quantities of material such as butter and the like and to form the measured quantity in a desired moulded form.

More particularly, the invention in the more preferred forms, comprises a casing for molding the butter or like material, a plunger in such casing and automatically operating means for positioning the plunger in the casing for the desired different measured quantities.

Further features and objects of the invention will be more fully understood from the following detail description and the accompanying drawings, in which—

Fig. 1 is a central longitudinal section of one form of the invention;

Fig. 2 is a side elevation of the same;

Fig. 3 is a detail sectional view on line 3—3 of Fig. 1; and

Fig. 4 is a sectional view on line 4—4 of Fig. 1.

Referring to the drawing, 1 is a casing having a square cross section as indicated in Fig. 4, for use for molding a rectangular block of butter or the like. It will be understood that the section of the casing is formed in conformity to the cross section of the moulded product.

Within the casing 1 is disposed the plunger 2 suitably mounted on the plunger rod 3. The plunger rod 3 is fixed to the locating block 4, slidably mounted within the hollow passage 5 of the hollow stem 6 to which the casing 1 is fixed. As shown in the drawings, the hollow stem 6 is provided with a projecting flange 7 receiving the casing 1 and the casing is riveted thereto by the rivets 8, the inner heads of the rivets 8 being flush with the inner face of the casing 1.

The plunger 2 may be secured to the plunger rod 3 as shown, as by providing a suitable opening 9 within the boss 10 of the plunger 2 and fitting the lower end of the plunger rod 3 tightly therein.

The plunger rod 3 is secured to the locating block 4 by tightly fitting the upper end of the plunger rod 3 within the perforation 11 in the block 4. The handle 12 of the plunger rod 3 is secured to the locating block 4, as by integral casting therewith.

The hollow stem 5 is slotted longitudinally to provide the guide-way 13 for the movement of the handle 12 upon actuation of the plunger 2 within the casing 1.

The hollow stem 6 is provided with the hand-hold 14, extending preferably in the plane of and away from the handle 12.

Co-acting with the handle 12 is arranged the retaining means 15 pivotally mounted at 16 on the handle 12, and its dog 17 and expansive spring 18 co-operating with the spaced notches 19 disposed along the stem 6 adjacent and in pairs on opposite sides of the guide-way 5.

The spacing of the notches 19 as shown in the drawings is illustrative of my device for use in removing three pounds of butter wherein the positioning of the retaining means 15 in the uppermost pair of notches corresponds to three pounds of butter, the next pair of notches two pounds, and the next pair of notches one pound; the lowermost pair of notches fully emptied condition of the casing.

The retaining means are constructed to secure accurate seating in the respective notches for the corresponding measurements. For such purpose the dog 17 of the retaining means 15 projects outwardly at 20 and any notch 19 extends similarly inwardly at 21 to provide mutually frictionally engaging faces of relatively large area to withstand displacement upwardly, and the lower and horizontal, outwardly extending face 22 of any notch 19 limits the downward displacement of the dog 17.

The operation of my device will be largely understood from the foregoing description and the following explanation of use should suffice to show the mode of its operation.

Assuming butter to be the article to be measured in moulded form and to be withdrawn from a tub or from bulk, the handle 12 is moved to its uppermost position by the operator grasping in one hand the handle 12 and the retaining means 15, thereby withdrawing the dog 17 from its position in any intermediate notch and permitting the handle 12 and therewith the plunger 3 to be moved to their uppermost positions respectively. The operator then grasps the hand-hold 12 in his other hand and then forces the casing 1 into the bulk of butter until the interior of the casing is completely filled. The device is now withdrawn from the bulk of butter and its contents is the maximum capacity of butter. To obtain say but one pound of butter, the handle 12 is forced downwardly of the hollow stem 6 until the retaining means 15 is in position with the next pair of notches 19 and the butter extending beyond the mouth of the casing is cut off say with a knife, using the peripheral edge of the mouth of the casing as a guide. The severed and moulded portion will have the weight of one pound. Successive one pound portions of butter are obtained by advancing the handle to the succeeding notches and severing similarly as above described.

The maximum capacity of the device and the units of measured quantities may be varied from the foregoing example, as will be apparent.

The plunger and movable parts of my device are arranged to be readily disassembled, and the hollow stem 6 of open frame construction to facilitate ready access in cleansing.

Whereas I have described my invention by reference to specific forms thereof, it will be understood that many changes and modifications may be made without departing from my invention as defined by the appended claims.

What I claim is:—

1. A measuring machine for plastic substances comprising a casing, a plunger in said casing, a hollow stem secured to said casing, a hand-hold fixed to said casing, a rod for said plunger and disposed within said hollow stem, said hollow stem being provided with a longitudinal guide slot, a handle secured to said rod and passing through said guide slot, a series of notches arranged longitudinally on said stem and spring-pressed retaining means carried by said rod and co-acting with said notches respectively to retain said rod against longitudinal displacement when said retaining means is seated in any notch.

2. A measuring device for plastic substances comprising a casing, a plunger in said casing, a hollow stem secured to said casing, a hand-hold fixed to said hollow stem, a plunger rod for said plunger and disposed within said hollow stem, said hollow stem being provided with a guide slot extending longitudinally a distance approximately equal to the longitudinal dimension of said casing, a handle secured to said plunger rod and passing through said guide slot, a series of notches arranged longitudinally of said hollow stem, each of said notches comprising a lower substantially horizontally extending face and an upper vertically extending face, a dog pivoted to said handle of said plunger rod and resilient means controlling said dog.

In testimony whereof I have signed this specification this 29th day of September, 1920.

EUGENE W. KNOWLTON.